United States Patent

Barron

[15] 3,648,814

[45] Mar. 14, 1972

[54] LIQUID COOLED CLUTCH
[72] Inventor: Charles D. Barron, Huntington Beach, Calif.
[73] Assignee: Byron Jackson Inc., Long Beach, Calif.
[22] Filed: Mar. 16, 1970
[21] Appl. No.: 19,601

[52] U.S. Cl. .................................192/113 B, 188/264 D
[51] Int. Cl. .........................................................F16d 13/72
[58] Field of Search ...............192/113 B; 188/264 D, 264 P; 137/608, 612

[56] References Cited

UNITED STATES PATENTS

| 2,672,954 | 3/1954 | Bennett | 188/264 D |
| 3,530,965 | 9/1970 | Wilson | 192/113 B |
| R4,346 | 4/1871 | Doyle | 137/608 |

Primary Examiner—Mark M. Newman
Assistant Examiner—R. Heald
Attorney—Donald W. Banner, William S. McCurry and John W. Butcher

[57] ABSTRACT

A liquid cooled clutch having a floating pressure plate and an opposed backup plate between which a relatively rotatable friction disc is gripped, both of the floating plate and the backup plate having annular coolant passages, and liquid coolant being supplied simultaneously to the coolant passages of both plates. Each of the plates has a coolant inlet communicating with the coolant passages in the plate through restricted orifices which provide sufficient differential pressure to assure distribution of the coolant and to all of the coolant passages.

9 Claims, 6 Drawing Figures

PATENTED MAR 14 1972

INVENTOR
CHARLES D. BARRON
BY John O. Evans, Jr.
ATTORNEY

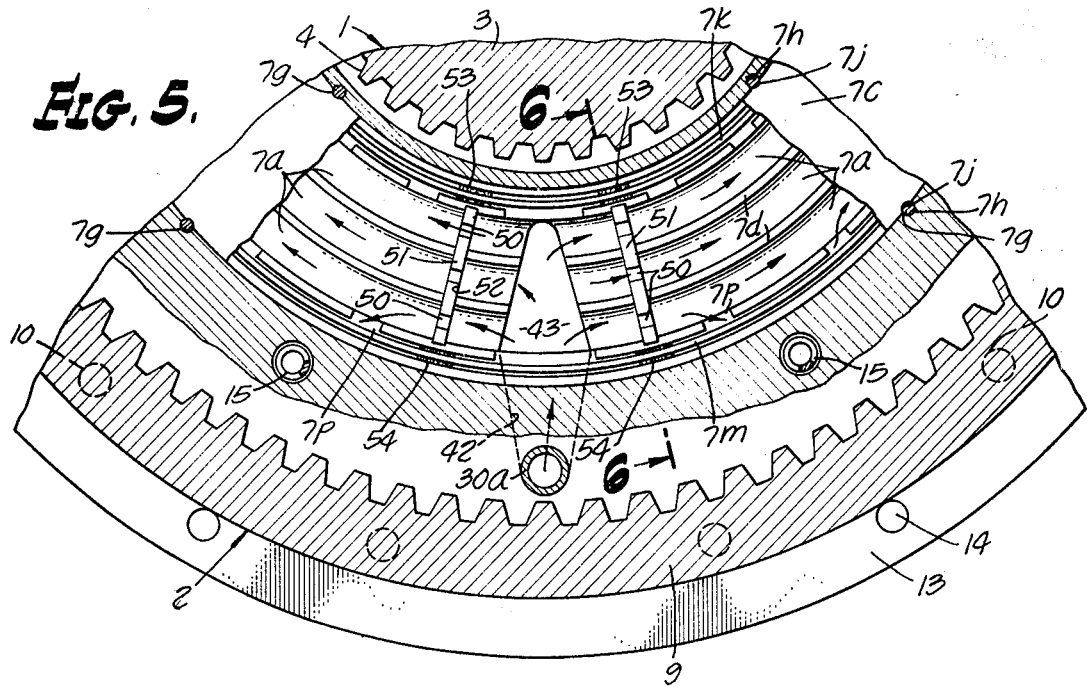
FIG. 5.
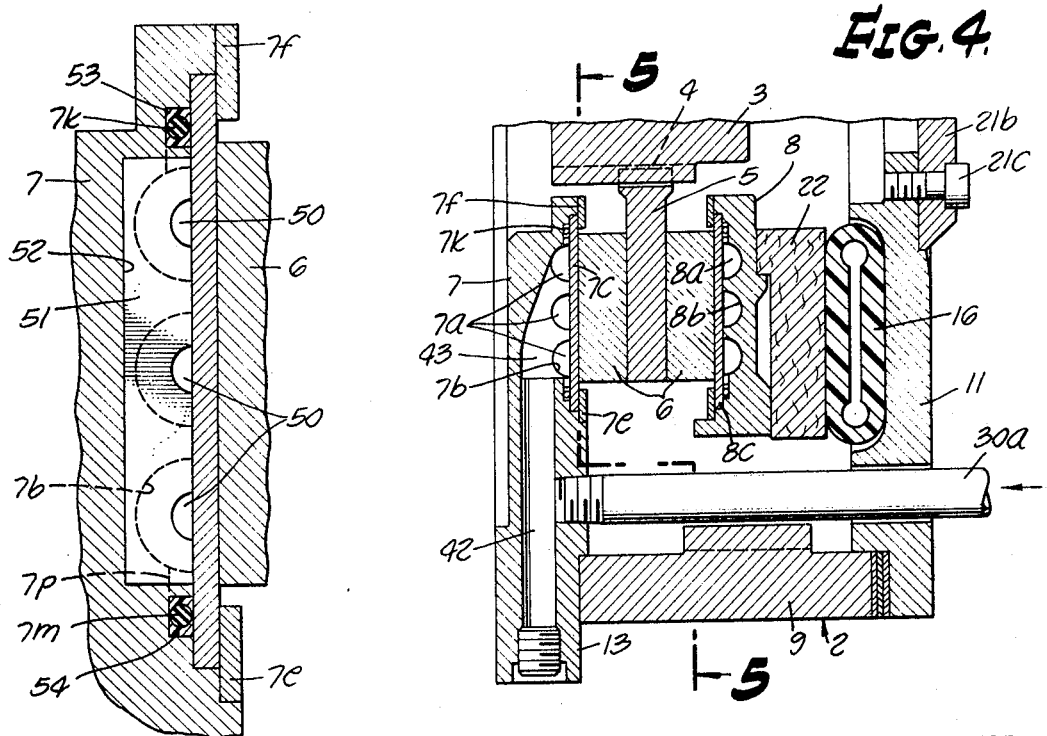
FIG. 6.
FIG. 4.
INVENTOR
CHARLES D. BARRON
BY John O. Evans, Jr.
ATTORNEY 3,648,814

LIQUID COOLED CLUTCH

BACKGROUND OF THE INVENTION

It is the practice in certain friction devices, such as brake or clutch assemblies to provide for the circulation of a coolant liquid through the assembly, the liquid generally being cooled in a heat exchanger so as to maintain at a practical level the heat generated by the frictional coengagement of the relatively rotatable components, whereby the effective life of the friction components and the efficiency of the brake or clutch assembly are enhanced. However, the distribution of the cooling fluid through the usual coolant passages has posed problems.

For example, a typical liquid cooled friction device comprises as its essential components an assembly which comprises a back-up plate and a floating plate arranged in coaxial opposed relation with at least one relatively rotatable friction disc or element interposed between the plates, and actuator means for shifting the floating plate towards the back-up plate to grip the friction disc. This frictional coengagement, particularly in the presence of slippage creates substantial heat which if not dissipated is destructive of the operating efficiency of the friction device as well as destructive of the life of the friction components.

In order to dissipate the heat of friction, the floating plate and the back-up plate are provided with coolant passages in the form of a number of concentric, radically spaced, circumferentially extended grooves covered by a wear plate. The wear plate frictionally engages the friction disc and a coolant fluid is circulated through the coolant passages, in contact with the wear plate, to dissipate such heat. When the coolant fluid is circulated through the coolant passages in the respective plates serially, say, first through the coolant passages of the floating plate and then through the passages of the back-up plate, the back-up plate inherently is cooled to a lesser extent than the floating plate. On the other hand, if the flow of coolant is spread between the coolant passages of the respective plates so as to be conducted to the coolant passages in a parallel fashion, there is lack of certainty that sufficient coolant flow to all of the coolant passages will be accomplished in the absence of which undesirable over-heating of one or the other of the plates and its associated friction elements may occur. This problem is aggravated by the effect of centrifugal force when the plates are rotating clutch plates, since the tendency is for the major portion of the coolant fluid to flow through the radially outermost coolant passages resulting in ineffective cooling of the clutch plates and the associated friction elements in the region of the innermost coolant passages.

SUMMARY OF THE INVENTION

The present invention obviates the problems of unequal distribution of flow of coolant fluid through the coolant passages of liquid cooled friction devices of the type referred to above.

More particularly, the present invention provides means whereby a differential pressure is maintained at the coolant inlet to the respective coolant passages in the plates of such a friction device, whereby distribution of the coolant to all of the coolant passages is assured, notwithstanding the centrifugal effect when the friction device is a clutch.

More specifically, the present invention provides a liquid cooled friction device of the type wherein circumferentially extended, radially spaced coolant passages are provided in the plates, the coolant fluid being supplied to an inlet chamber lying between opposed orifices in the coolant passages through which the coolant must flow into the coolant passages, the orifices causing sufficient differential pressure to assure distribution of the coolant from the inlet to all of the coolant passages. In accomplishing the foregoing, the orifices may be provided in the plates of the friction device when the latter are cast or the orifices may be otherwise provided, as by the installation of orifice blocks in the previously formed clutch plates.

As a result of the present invention, the liquid cooled assembly is enabled to work to its maximum capacity with a minimum of change in temperature and resultant change in the coefficient of friction. The generation of excessive temperatures is prevented so that damage to the friction components due to excessive heat is eliminated.

These advantages stem from the fact that with the present invention sufficient coolant is supplied to each groove, so that the temperature rise in the region of all of the grooves in the respective plates is minimized, but in any event, is comparatively uniform. It will be understood in this connection that by selection of orifice size the desired ratio of coolant for each of the grooves may be attained.

Advantageous applications of the present invention include, among others, the drive for a winch or cable drum, such as the hoist winch of a material or personnel handling crane, the towing winch of a tug, a drilling weight controlling winch for well drilling rigs, or other winch applications where it is desired that the clutch slip substantially continuously when the winch is loaded so as to apply a constant tension to the cable, or where the actuating force applied to the clutch to effect torque transmission is varied by a control system to enable a load supported by a winch to be moved in synchronism with a moving winch support or with a moving surface or location on which the load is to be placed or from which the load is to be removed.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

BRIEF DESCRIPTION OF THE DRAWINGS

FIG. 2 is a vertical section, as taken on the line 2—2 of FIG. 1, showing a coolant supply to and outlet from a plate of the clutch;

FIG. 5 is a fragmentary view in section, as taken on the line 5—5 of FIG. 4, showing a typical coolant inlet means for the clutch plates, and showing the flow restricting means of the invention in the coolant passages; and FIG. 6 is an enlarged fragmentary view in section, as taken on the line 6—6 of FIG. 5.

DESCRIPTION OF THE PREFERRED EMBODIMENT

Figure 1:
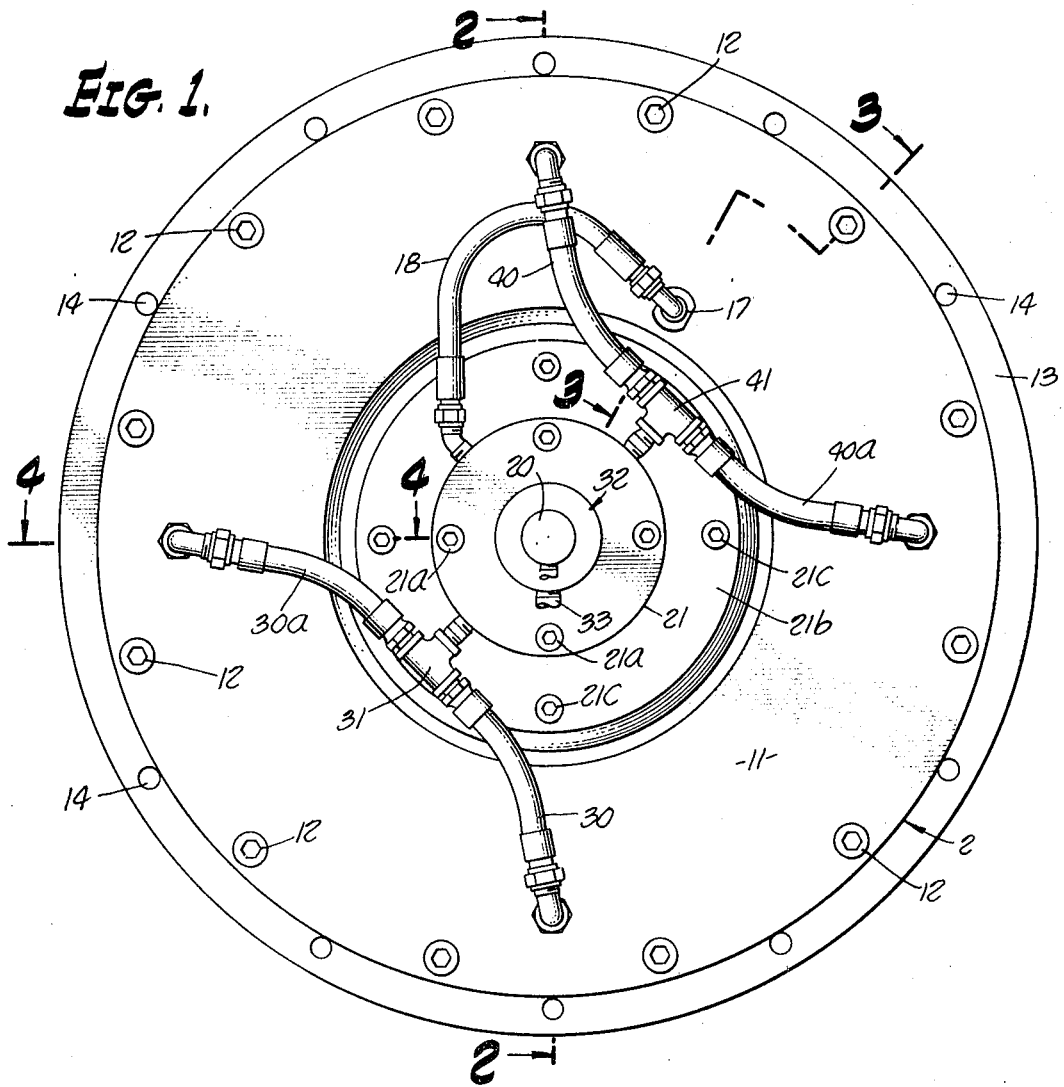
FIG. 1 is an end elevation of a clutch assembly embodying the present invention.

As seen in the drawings, the friction device is illustrated as a clutch comprising a supporting structure or member generally denoted at 1 and another supporting structure or member generally denoted at 2, the supporting structures being relatively rotatable. Obviously, if the friction device is to function as a brake, one of the support members 1 and 2 would be fixed against rotation, but in either event, the assembly is operable to transmit torque from one of the members 1 and 2 to the other of those members.

More particularly, the member 1 is in the form of a hub 3 adapted to be keyed or otherwise connected to a shaft (not shown) for rotation with the shaft. Disposed about the hub 3 and connected thereto for rotation therewith and for axial sliding movement thereon by a splined connection 4 are friction means in the form of an annular disc 5 having friction facing material 6 on its opposite side faces. The friction means or disc 5 is adapted to be frictionally engaged between a back-up plate 7 and a floating pressure plate or actuator plate 8 movable towards and away from the back-up plate 7, the plates 7 and 8 being incorporated in the structure 2.

Figure 3:
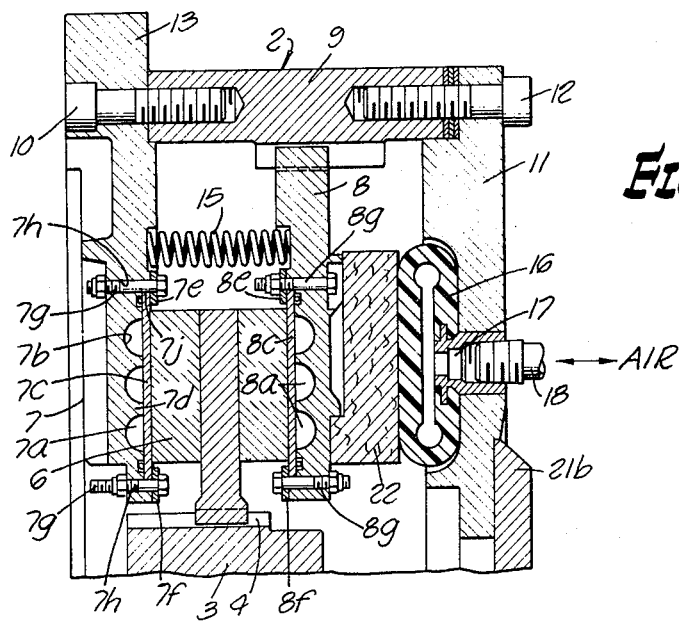
FIG. 3 is a fragmentary view in section, as taken on the line 3—3 of FIG. 1, showing an air port for the clutch actuator means.

More particularly, the structure 2 comprises an outer annular body 9 on one end of which the plate 7 is secured by a suitable number of circumferentially spaced fasteners 10 (FIG. 3). On the other end of the outer body 9 is an annular, supporting plate 11 secured to the body 9 by a suitable number of circumferentially spaced fasteners 12. The structure 2 also includes means for connecting it to a member to be rotated, and in the illustrative structure the back-up plate 7 extends outwardly beyond the outer periphery of the annular body 9 to provide a flange 13 having a suitable number of circumferentially spaced fastener openings 14 whereby the flange 13, and thus the structure 2 may be connected to a drive or a driven member.

Typically, clutches of the type here involved are spring loaded to a disengaged condition. Thus, a suitable number of coiled compression springs 15 are interposed between the back-up plate 7 and the floating or pressure plate 8 to normally bias the latter away from the back-up plate 7 so that the friction device 5 is free to rotate between the clutch plates 7 and 8. In order to actuate the clutch into an engaged condition, an expansible tube 16 is interposed between the supporting plate 11 and the floating or pressure plate 8, and as seen in FIG. 3 actuating fluid port means 17 are provided for conducting, say, air under pressure to and from the tube 16 from an air supply conduit 18. The conduit 18 is supplied with air from a source (not shown) through a fitting 20 and a typical swiveling air connector 21, the details of which are well known and need no further illustration or description herein. Swivel connector 21 and, more particularly, the rotary portion thereof is suitably connected by fasteners 21a to a carrier disc 21b which is suitably supported by the support plate 11, as by connection of the carrier disc 21b to the support plate 11 by fasteners 21c.

Preferably, an insulator ring 22 is interposed between the expansible actuator tube 16 and the pressure or floating plate 8 to reduce the conduction of heat from the plate 8 to the expansible actuator tube 16.

In order to cool the clutch plates 7 and 8 they are respectively provided with coolant passages 7a and 8a, these passages being circumferentially extended, concentric, and radially spaced, and of course, varying in number depending upon the size of the friction device involved, so that a suitable number of such passages are located adjacent to the region of frictional contact of the clutch plates 7 and 8 with the friction disc 5.

The passages 7a in the back-up plate 7 are defined between passageways 7b formed in the inner face of the clutch plate 7 and a wear plate or disc 7c which is carried by the body of clutch plate 7 and has frictional coengagement with the friction facing 6 of the friction disc 5. Lands 7d between the passageways 7b are engageable with the wear plate or disc 7c to divide the passages 7a and to maintain separate and distinct flow paths. The wear plate or disc 7c is retained in assembly with the clutch plate 7 by a retainer ring 7e at the outer periphery and a retainer ring 7f at the inner periphery, these retainer rings 7e and 7f being secured to the clutch plate 7 by a suitable number of circumferentially spaced fasteners 7g which extend through openings 7h in the plate 7. If necessary or desired, the fasteners 7g may also engage in notches 7j in the wear plate or disc 7c to prevent angular slip of the latter. Resilient seal rings 7k and 7m are disposed in grooves in the clutch plate 7 for sealing engagement with the wear plate or disc 7c adjacent its inner and outer margins respectively. Notches 7p are usually formed in the plate 7 to allow flow of some coolant through the O-ring grooves to effect cooling of the wear disc or plate 7c to the maximum radial extent.

Correspondingly, the pressure or floating clutch plate 8 has its coolant passages 8a defined between passageways 8b and a wear plate or disc 8c which has frictional coengagement with the friction facing 6 of the friction disc 5. Lands 8d between the passageways 8b are engageable with the wear plate or disc 8c to divide the passages 8a and to maintain separate and distinct flow paths. The wear plate or disc 8c is connected to the clutch plate 8 in the same manner that the wear plate or disc 7c is connected to the clutch plate 7, including retainer rings 8e and 8f connected to the clutch plate 8 by fasteners 8g. In addition, seal rings 8k and 8m are interposed between the clutch plate 8 and the wear plate 8c.

Inlet and outlet means are provided to enable the flow of a coolant liquid through the passages 7a and 8a. Referring to FIGS. 1 and 2, the inlet and outlet means for the pressure or floating plate 8 are illustrated. The plate 8 has a cooling inlet chamber 25 which radially intersects all of the coolant passages 8a so as to communicate therewith. A radial port 26 in the plate 8 leads between the inlet chamber 25 and the port 27 in an inlet fitting 28 which is secured to the outer periphery of the plate 8 by suitable fasteners 29. Connected to the fitting 28, in communication with port 27, is inlet conduit means 30 to which coolant liquid is supplied from a T-fitting 31 which is carried by the swivel connector 21, previously referred to, to which coolant is supplied from a typical coolant inlet-outlet manifold 32. Coolant is supplied to the manifold 32 through a conduit 33 and exhausted through a conduit 34. The coolant outlet means of the pressure or floating plate 8, comprises an outlet chamber 35 which radially intersects the passages 8a for communication therewith. A radial outlet port 36 leads from the outlet chamber 35 to the port 37 of a fitting 38 which is secured to the outer periphery of the plate 8 by suitable fasteners 39. Outlet conduit means 40 communicates with the port 37 to conduct coolant from the outlet chamber 35 to the swivel connector 21 and thence to the manifold 32 for discharge through the conduit 34.

Figure 4:
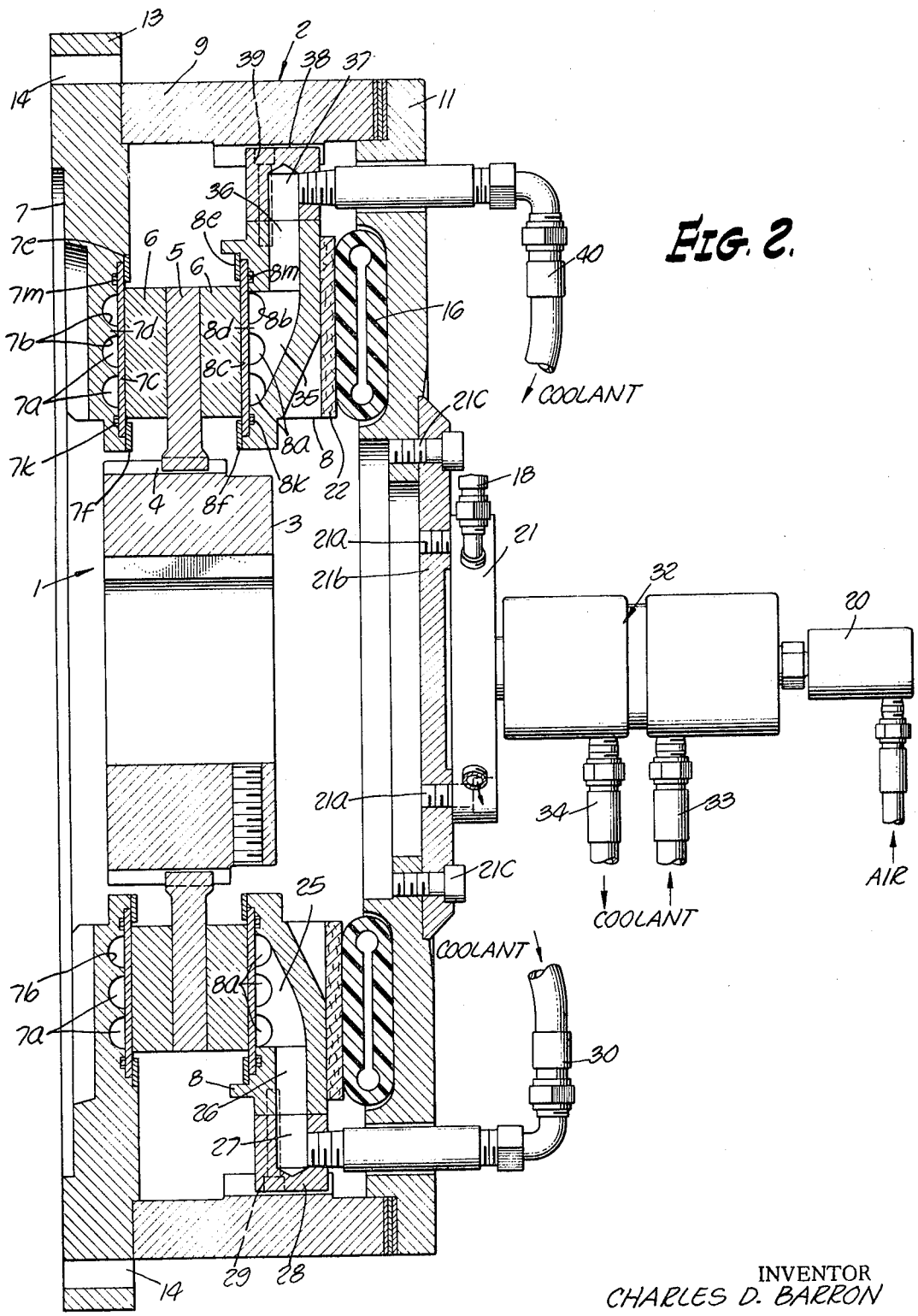
FIG. 4 is a fragmentary view in section, as taken on the line 4—4 of FIG. 1, showing a coolant inlet for the other plate of the clutch.

As seen in FIG. 1, the inlet conduit means 30 and the outlet conduit means 40 extend through the support plate 11 at diametrically opposite locations. The inlet conduit means 30 is connected by the T-fitting 31 to inlet conduit means 30a which extends through the support plate 11 at a location spaced 90° from the entry of the conduit means 30 through the support plate 11. Correspondingly, the outlet conduit means 40 is connected by the T-fitting 41 to outlet conduit means 40a which extends through the support plate 11 at a location 90° displaced from the entry of the outlet conduit 40 through the support plate 11, but in diametrically spaced relation to the point of entry of the inlet conduit means 30a through the support plate 11. By virtue of this displaced relationship, it is apparent that the inlet conduit means 30a and the outlet conduit means 40a are adapted to span the clutch assembly between the support plate 11 and the back-up plate 7, as exemplified in FIG. 4. In this view, it will be seen that the inlet conduit means 30a communicates with an inlet port 42, which extends radially in the back-up plate 7, into communication with an inlet chamber 43 which intersects all of the coolant passages 7a in the back-up plate 7. Without need of further illustration or description, it will be apparent that the outlet conduit means 40a will similarly be connected to a similar outlet chamber (not shown) in the back-up plate 7, whereby coolant fluid entering the inlet chamber 43 will flow through the passages 7a and will be discharged through the conduit means 40a and the T-fitting 41 to the swivel connector 21.

The friction device construction as thus far described is conventional and may be variously constructed or modified in respect of the number of friction discs and floating plates, as is well known in the clutch and brake art.

The present invention involves the provision of means for improving the distribution of the coolant fluid in the coolant fluid passages 7a and 8a, whereby the clutch plates and discs are more effectively cooled and the torque transmitting efficiency of the assembly is enhanced. The improvement will best be understood by reference to FIGS. 5 and 6. More particularly, it will be noted that at opposite sides of the inlet chamber 43, and thus, between the chamber 43 and the diametrically located outlet chamber, flow restricting means are provided including restricting orifices 50 formed in orifice blocks 51 which are seated in slots 52 provided in the clutch plate and intersecting the coolant fluid passages 7a. An inner seal 53 is provided at the inner end of each orifice block 51, and outer seal 54 is provided at the outer end of each orifice block 51, these inner and outer seals preventing the bypass of fluid around the ends of the orifice blocks 51 in the usual O-ring groove which receives seal rings 7k and 7m. The restricted passages or orifices 50 cause a greater pressure in the inlet chamber 43 than exists in the passages 7a at the opposite side of the orifice from the chamber 43. This differential pressure assures a distribution of the coolant fluid from the chamber 43 to all of the coolant passages 7a, as indicated by the arrows. Such distribution will be effective notwithstanding the fact that the structure 2 including the back-up plate 7 is rotated so that centrifugal force would otherwise tend to cause coolant to flow predominately, if not entirely, through the radially outermost of the coolant passages 7a. The result of the invention is more effective cooling of the assembly throughout the entire radial extent of frictional coengagement of the plate 7 and the disc 5.

It will be understood without need of further illustration or description that similar flow diverting means will be employed to effect distribution of the coolant fluid in the passages 8a of the pressure plate 8, so that it is more effectively cooled.

By virtue of the present invention moreover, it is possible to effectively supply cooling liquid to the respective plates from a source which splits the fluid flow in a parallel fashion, as the coolant fluid flow is split between the inlet conduit means 30 and 30a and the outlet conduit means 40 and 40a in a parallel fashion. Thus, equally cooled fluid is supplied to all of the passages; whereas, in the prior clutches or brakes of the type herein illustrated, the parallel flow of coolant fluid to both plates resulted in uncertainty that sufficient fluid would flow to both plates rather than the bulk of fluid flowing through one plate.

While in the illustrated embodiment, the orifices 50 have been shown as being provided in a orifice block, it will be apparent that the barriers provided by the orifice blocks in the respective coolant passages may also advantageously be formed during casting of the respective clutch plates. The orifices may be formed either during the casting or in a later operation, and the orifice size or the relationship between orifice sizes can be determined by the service to which the friction device is to be applied and the availability of coolant fluid.

I claim:

1. In a friction device having relatively rotatable support members, a pair of plates carried by one of said members and movable one toward the other, friction means including at least one friction disc carried by the other of said members and disposed between said plates for coengagement therebetween upon movement of one of said plates toward the other of said plates, actuator means for moving said one plate, said plates each having means defining a plurality of circumferentially extended, radially spaced coolant passages in the side of the plate adjacent said disc, each plate having inlet means for a liquid coolant including a chamber communicating with said coolant passages, and outlet means for said coolant communicating with said coolant passages, the improvement comprising flow restricting means in said coolant passages having orifices smaller than the entrances into said coolant passages to cause an increase in the pressure gradient across said restricting means and thereby provide a proper flow distribution of coolant through each of said coolant passages.

2. In a friction device as defined in claim 1, said flow restricting means comprising an orifice in each passage between said chamber and said outlet means.

3. In a friction device as defined in claim 1, said coolant passages extending from opposite sides of said chamber and said flow restricting means comprising an orifice in each passage at opposite sides of said chamber.

4. In a friction device as defined in claim 1, said plates each having a wear disc, said plates having passageways therein, and said passageways and said wear disc defining said coolant passages therebetween.

5. In a friction device as defined in claim 1, said plates each having a wear disc, said plates having passageways therein, said passageways and said wear disc defining said coolant passages therebetween, said plates and said wear disc having annular, radially spaced seal rings therebetween for confining the flow of coolant, and including means forming a seal to prevent the bypass of fluid around said flow restricting means between the latter and said seal rings.

6. In a friction device as defined in claim 1, said inlet means comprising inlet conduits leading to said chamber in each plate, and means for conducting coolant to said inlet conduits in parallel.

7. In a friction device as defined in claim 1, said coolant passages extending from opposite sides of said chamber and said flow restricting means comprising a pair of orifice blocks at opposite sides of said chamber, said plate having slots receiving said orifice blocks, and each orifice block having an orifice in each of said coolant passages.

8. A plate for a friction device of the liquid cooled type, said plate comprising a disclike, flat body having in one side face a number of circumferentially extended, radially spaced coolant passages, a coolant inlet means including a chamber communicating with said coolant passages and a coolant outlet means communicating with said passages, and flow restriction means in each coolant passage interposed between said chamber and said outlet means and having an orifice smaller than the entrance into said coolant passage to cause an increase in the pressure gradient across said restriction means and thereby provide a proper flow distribution of coolant through each of said coolant passages.

9. A plate as defined in claim 8, comprising a wear disc removably carried by said plate, said plate having circumferentially extended, radially spaced passageways, and said wear disc and said passageways cooperating to form said coolant passages.

* * * * *